(12) United States Patent
Lambert et al.

(10) Patent No.: US 8,812,459 B2
(45) Date of Patent: Aug. 19, 2014

(54) METHOD AND SYSTEM FOR TEXT INTERPRETATION AND NORMALIZATION

(75) Inventors: Jerry Lambert, Grapevine, TX (US); Shiraz Khalid, Addison, TX (US)

(73) Assignee: Touchstone Systems, Inc., Dallas, TX (US)

( * ) Notice: Subject to any disclaimer, the term of this patent is extended or adjusted under 35 U.S.C. 154(b) by 394 days.

(21) Appl. No.: 12/752,321

(22) Filed: Apr. 1, 2010

(65) Prior Publication Data

US 2010/0257172 A1 Oct. 7, 2010

Related U.S. Application Data

(60) Provisional application No. 61/202,761, filed on Apr. 1, 2009.

(51) Int. Cl.
*G06F 7/00* (2006.01)

(52) U.S. Cl.
USPC .......................................................... 707/688

(58) Field of Classification Search
CPC G06F 9/45508; G06F 11/3608; G06F 17/277
USPC .......................................... 707/693, 739, 771
See application file for complete search history.

(56) References Cited

U.S. PATENT DOCUMENTS

| | | | | |
|---|---|---|---|---|
| 4,773,009 A | * | 9/1988 | Kucera et al. | 715/260 |
| 5,572,206 A | * | 11/1996 | Miller et al. | 341/51 |
| 5,737,608 A | * | 4/1998 | Van De Vanter | 717/112 |
| 5,850,629 A | * | 12/1998 | Holm et al. | 704/260 |
| 5,924,068 A | * | 7/1999 | Richard et al. | 704/260 |
| 6,047,277 A | * | 4/2000 | Parry et al. | 706/20 |
| 6,470,306 B1 | * | 10/2002 | Pringle et al. | 704/3 |
| 7,822,598 B2 | * | 10/2010 | Carus et al. | 704/9 |
| 2002/0005865 A1 | * | 1/2002 | Hayes-Roth | 345/706 |
| 2005/0172338 A1 | * | 8/2005 | Sandu et al. | 726/22 |
| 2006/0069545 A1 | * | 3/2006 | Wu et al. | 704/8 |
| 2006/0116862 A1 | * | 6/2006 | Carrier et al. | 704/1 |
| 2008/0033715 A1 | * | 2/2008 | Barklund et al. | 704/9 |
| 2008/0077573 A1 | * | 3/2008 | Weinberg et al. | 707/5 |
| 2009/0070328 A1 | * | 3/2009 | Loeser et al. | 707/6 |
| 2009/0157385 A1 | * | 6/2009 | Tian | 704/9 |
| 2010/0290482 A1 | * | 11/2010 | Martino et al. | 370/450 |
| 2011/0302553 A1 | * | 12/2011 | Gulwani | 717/107 |

OTHER PUBLICATIONS

Firoj Alam, S. M. Murtoza Habib, Mumit Khan, "Text Normalization System for Bangla", Center for Research on Bangla Language Processing, Brac University, 2008).*

* cited by examiner

*Primary Examiner* — Mohammed R Uddin
(74) *Attorney, Agent, or Firm* — Andrews Kurth LLP; Sean S. Wooden; Matthew J. Esserman

(57) ABSTRACT

A system and method for text interpretation and normalization is presented. The method for text interpretation and normalization may include receiving a reference data entry that includes one or more strings of text and one or more associated numeric codes, creating a plurality of tokens from the one or more strings of text, each token being tied to an associated numeric code, formatting the plurality tokens with operations codes (opcodes) that provides additional information about the tokens, retrieving configuration data including the plurality of tokens, the opcodes, and numeric codes associated with the tokens, selecting one inbound, non-reference string for interpretation, comparing tokens from the configuration data to the non-reference string to determine the best matching token, and applying, using the processor, the numeric code associated with the best matching token to the non-reference string in order to normalize the non-reference string.

13 Claims, 4 Drawing Sheets

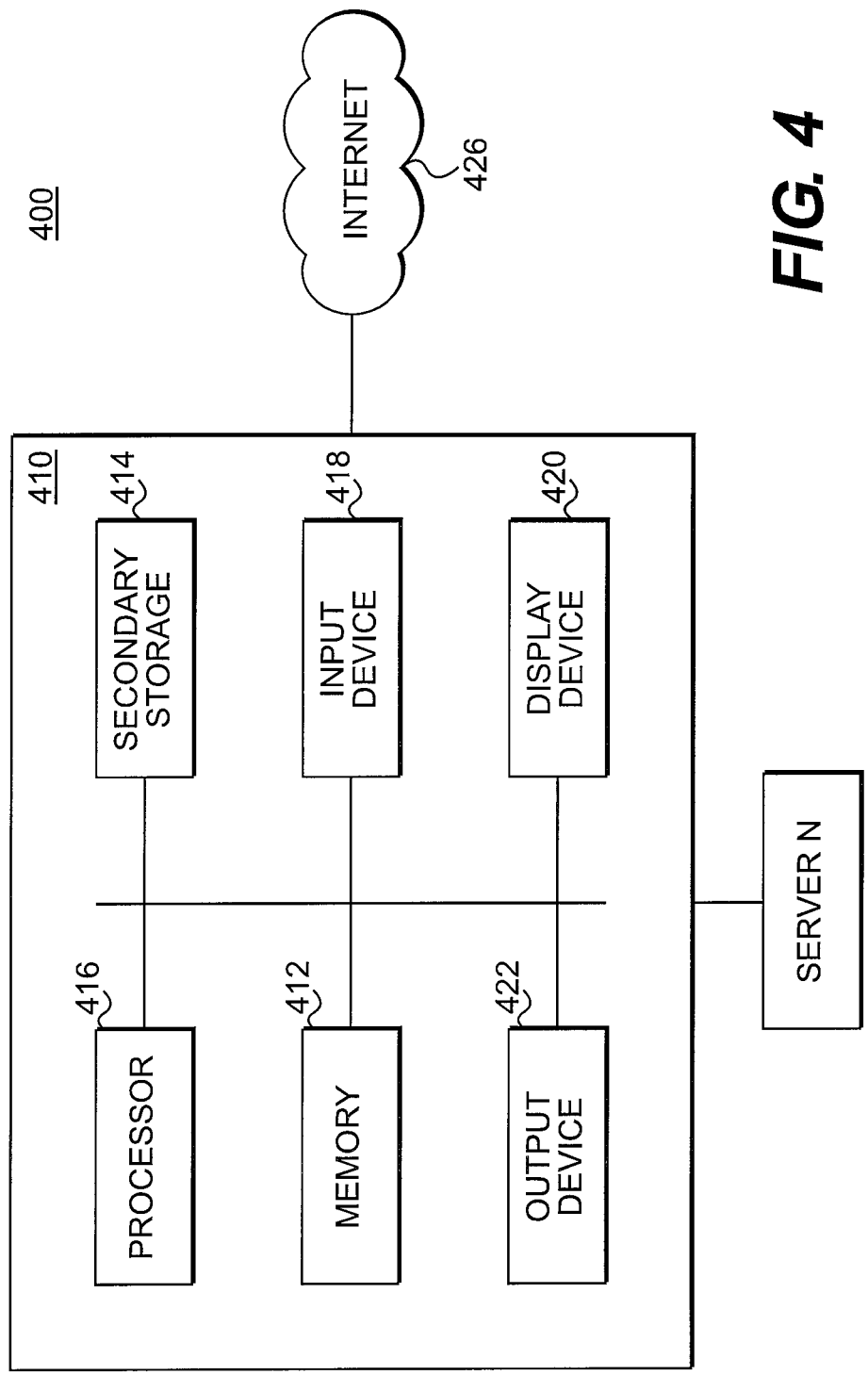

METHOD AND SYSTEM FOR TEXT INTERPRETATION AND NORMALIZATION

BACKGROUND

Unfortunately, data processing operations often deal with imperfect data. The task of normalizing slight variations in discreet text entries is often a tedious manual job. Correcting minor differences such as between "South Korea," "S. Korea" and "Korea-South" often frustrate data managers as these variations cause inevitable data processing exceptions. In some cases the data is an approximate match to a standard when an exact match is required. For example: matching a list of standardized country, region and city names with an arbitrary set of geographic names with the added complication of determining whether those entries refer to specialized subsets (such as cellular areas) can be frustrating and time consuming.

To illustrate this example, see the table below in which the following arbitrary entries may all match the standardized entry "China Beijing Mobile":

| | | |
|---|---|---|
| China Beijing Mobile | China Beij (Mobile) | Beijing Cell |
| China Mobile (Beijing) | China Beij (Cell) | Beijing cellular |
| China Beijing (Mobile) | China Beij (Wireless) | Beijing wireless |
| China Beijing - [Cellular] | China Beij [Mobile] | Beijing [mobile] |
| China (Cellular) - Beijing | China Beij [Cell] | Beijing [wireless] |
| China Beijing - Mob | China Beij [Wireless] | Beijing [cellular] |
| China Beijing - Cell | China - Beijing (Wireless) | Beijing [cell] |
| China Beijing Wireless | China - Beijing (Cell) | |
| China Wireless (Beijing) | China - Beijing (Mobile) | |
| China Beijing [cell] | China Beijing | |
| China Beijing [Wireless] | Beijing - Mobile | |
| China (Wireless) Beijing | Beijing - Cell | |
| China Beij - Mobile | Beijing - wireless | |
| China Beij - Wireless | Beijing - cellular | |
| China Beij - Cellular | Beijing Mobile | |

Currently, no system exists that can be refined over time to capture each of the variants of the standardized entry and classify each variant according to the specification dictated by the standardized entry record.

One attempt to provide such a system is Soundex of Columbia University. Soundex is a system of indexing (and finding) names by the way they sound rather than the way they are spelled. Each name is assigned an index consisting of a letter and three numbers. When doing a Soundex search, two names match if they have the same index. For example, a Soundex search for Smith will match Smith, Smyth, Smitty, and possibly other names. If a user is not sure how to spell a particular name, Soundex may help the user find it.

On the other hand, Soundex may find many matches that are puzzling and unhelpful. It may find too many matches and not show any, in which case the user will want to give Soundex more details, e.g., first name or department. Soundex is optimized to correct "English" type spelling mistakes, e.g., Z for S, but not H for J or V for W (as in Spanish or German names).

The following is an example of how to Derive an Index Using Soundex

1. If the same letter occurs twice in a row in the name, drop one occurrence. For example, Lloyd becomes Loyd.
2. The letter in the index is the first letter of the name.
3. From the rest of the name, drop the vowels (A, E, I, O, U, and "soundless" letters H and W.
4. From the remaining letters, assign numbers to the first three as follows:
   1- B, P, F, V
   2- C, G, J, K, Q, S, X, Z
   3- D, T
   4- L
   5- M, N
   6- R
5. If there are fewer than three letters, use 0 for the remaining number(s). For the name Smith, it would work as follows:
   1. S is the first letter of the name, so the index starts with S.
   2. From the remaining letters (mith), drop the i and the h.
   3. M=5, T=3, and there are no letters left so add a 0.
   4. The index for Smith is S530

Unfortunately, Soundex technology cannot deal with situations where things are spelled completely different but mean the same thing. For example, Mobile and Wireless may both mean cellular. However, none of these terms sound remotely alike. Moreover, these words are not spelled at all similarly and do not share common roots. Consequently, Soundex and other current systems will be of no use in recognizing the similarity of these terms.

SUMMARY

Embodiments described herein have numerous advantages, including overcoming the defects of the prior art. These advantages may be achieved by a method for text interpretation and normalization. The method includes receiving a reference data entry that includes one or more strings of text and one or more associated numeric codes. Each associated numeric code is associated with one or more strings of text. The method further includes creating one or more tokens from the one or more strings of text. Each token is tied to an associated numeric code. The method also includes formatting the one or more tokens with an operations code (opcode) that provides additional information about the token. The one or more tokens may be used to interpret non-reference data and associate the non-reference data to one of the one or more associated numeric codes.

These advantages may also be achieved by a method for text interpretation and normalization that includes retrieving configuration data including a plurality of tokens, operation codes (opcodes) that provide additional information about the tokens, and numeric codes associated with the tokens, selecting one inbound, non-reference string for interpretation, comparing tokens from the configuration data to the non-reference string to determine the best matching token, and applying, using the processor, the numeric code associated with the best matching token to the non-reference string in order to normalize the non-reference string.

These advantages may also be achieved by a method for text interpretation and normalization that includes receiving a reference data entry that includes one or more strings of text and one or more associated numeric codes, creating a plurality of tokens from the one or more strings of text, each token being tied to an associated numeric code, formatting the plurality tokens with operations codes (opcodes) that provides additional information about the tokens, retrieving configuration data including the plurality of tokens, the opcodes, and numeric codes associated with the tokens, selecting one inbound, non-reference string for interpretation, comparing tokens from the configuration data to the non-reference string to determine the best matching token, and applying, using the processor, the numeric code associated with the best matching token to the non-reference string in order to normalize the non-reference string.

These advantages may also be achieved by a computer-readable medium including instructions for execution by a processor to perform the methods described above.

These advantages are also achieved by a system for text interpretation and normalization. The system includes a computer including a processor and memory. The memory includes a computer program stored therein that includes instructions that are executed by the processor for creating tokens by receiving a reference data entry that includes one or more strings of text and one or more associated numeric codes, in that each associated numeric code is associated with one or more strings of text, creating, using the processor, a plurality of tokens from the one or more strings of text, in that each token is tied to an associated numeric code, and formatting the plurality tokens with operations codes (opcodes) that provides additional information about the tokens, wherein the plurality of tokens may be used to interpret non-reference data and associate the non-reference data to one of the one or more associated numeric codes. The memory may further include a computer program stored therein that includes instructions that are executed by the processor for interpreting non-reference strings by retrieving configuration data including the plurality of tokens, the opcodes, and numeric codes associated with the tokens, selecting one inbound, non-reference string for interpretation, comparing tokens from the configuration data to the non-reference string to determine the best matching token, and applying the numeric code associated with the best matching token to the non-reference string in order to normalize the non-reference string.

BRIEF DESCRIPTION OF THE DRAWINGS

The detailed description may refer to the following drawings, wherein like numerals refer to like elements, and wherein:

FIG. 4 is a block diagram illustrating exemplary hardware components of an embodiment of a system for text interpretation and normalization.

DETAILED DESCRIPTION

Figure 1:
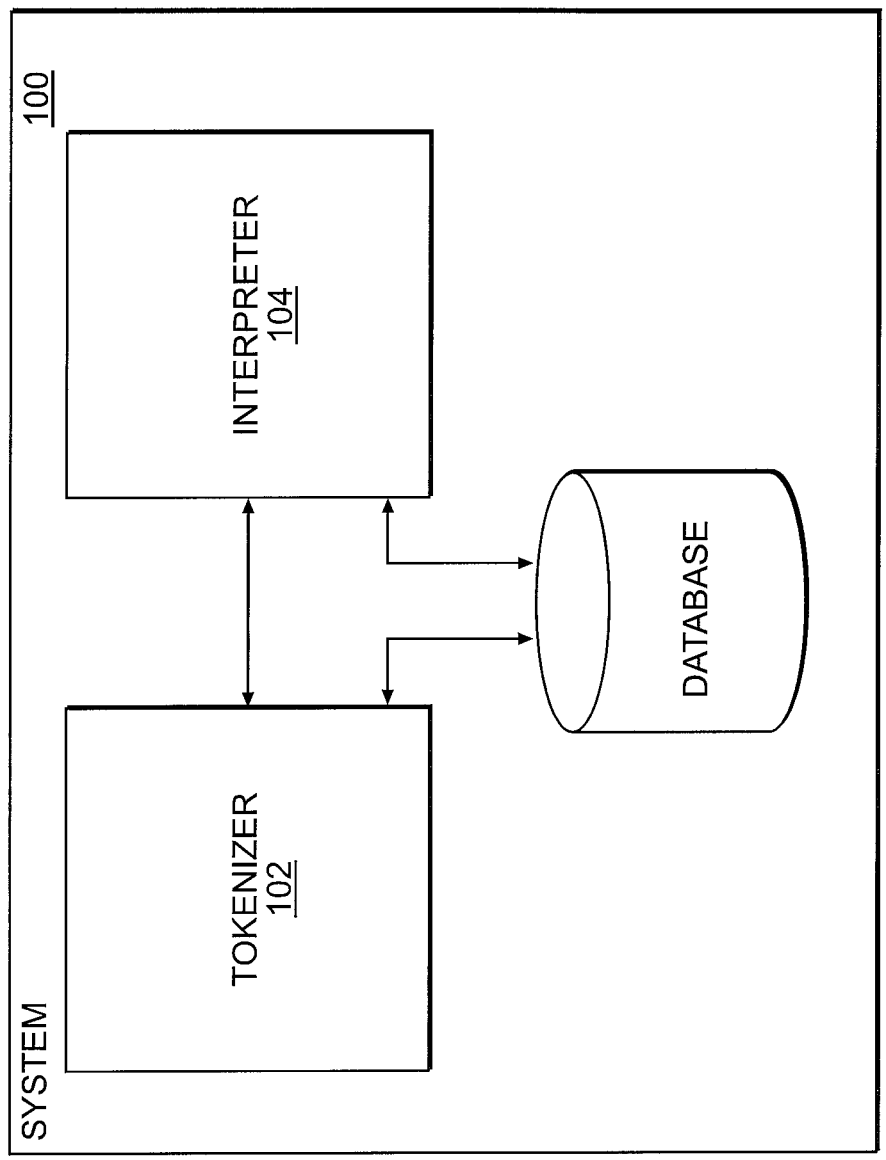
FIG. 1 is a block diagram illustrating exemplary software components of an embodiment of a system for text interpretation and normalization.

Described herein are embodiments of a method and system for text interpretation and normalization. Embodiments include methods, systems and software, e.g., embodied as computer-executable instructions stored on computer readable mediums, that may be referred to as a text interpretation and normalization application ("T.I.N.A."). Embodiments of T.I.N.A. may solve the above problems by using a two-phased approach referred to as "tokenizing" and "interpreting." The first phase, "tokenizing," may determine the best unique values to use for each reference data entry that is used for comparison with an inbound non-reference data. The unique values are tokenized to create tokens that are then used in the second phase. The second phase, "interpreting," may apply those tokens to the inbound non-reference data to identify the best matches and will apply the reference data associated with that best match to the non-reference data.

Embodiments overcome the problems in the prior art similar to the way a human brain might overcome these problems. For example, when looking at a list of arbitrary but similar inputs (e.g., using the geographic/telecommunications scenario described above) a human brain might realize that no matter how the rest of the word is shaped, the letters "Beij" anywhere in the data may be normalized to mean that these letter are a reference to Beijing, China. Embodiments described herein would also make this recognition. Likewise, in a similar way, embodiments may recognize and identify, for example, that the letters "Mob" anywhere after "Beij" means that this combinations of letters should normalize to "China Beijing Mobile." It should be noted that the word China in the data, in this example, was not even necessary for embodiments to evaluate Beij Mob as referring to China Beijing Mobile. In addition, the use of synonyms Cell, Cellular and Wireless would all have yielded the same result with the appropriate configuration.

In another example, embodiments might normalize to "Afghanistan" the following arbitrary data entries: "Afghanistan Proper" or "Afghanistan ROC" or "Afghan Fixed." In this example, the human brain might quickly identify that any word beginning with "Af" would match only a small set of the standardized records, i.e., those having to do with Afghanistan. Accordingly, embodiments herein make the same recognition by using the results of the tokenizing phase or manual configurations tuning, then looking either for those things (e.g., terms or characters) that are in the remainder of the word beginning with "Af" or for those things that are not, begin to isolate the possible choices.

For example, embodiments might determine in an example that:
1. There is an "ROC"
2. There is not a "Mob"
3. There is not a "Cel"
4. There is not a "Wireless"

The result would be a match to the standardized "Afghanistan."

Embodiments may perform this described process of recognition and normalization using a set of configuration records, called "Tokens" in a database that are queried and applied to an inbound arbitrary entry to find token combinations that match and those combinations that do not. The highest token count is selected and the inbound record is stamped with an identifier associating it with its standardized record.

To briefly summarize, embodiments create tokens from reference data. The reference data may include a plurality of pre-approved, standardized strings, reference strings, from which tokens are created. The reference data is the data to which incoming, arbitrary, non-reference data entries will be normalized. In other words, the incoming entries will be interpreted using the tokens so that strings in the incoming entries will be matched to the reference data and these strings will be normalized to be equivalent to the matching reference data strings. In embodiments, the reference data used will not only have a reference string, e.g., "Afghanistan," but also some other data used to identify the reference data (the reference data may be created by analysts or otherwise provided to the system 100). For example, each piece of reference data may have a numeric code associated with the reference string. The ultimate goal of embodiments described herein will be to use the tokens to interpret the incoming, non-reference data entries and tie the entries to one of the codes in the reference data. In embodiments, the tokens will have such codes from the reference data (from which the tokens were derived) associated with them so that when a token is found to match the non-reference data, the non-reference data will be tied to the same code. Accordingly, embodiments described herein may first create the tokens and store them in a token database for use in recognition and normalization.

With reference now to FIG. 1, shown is an embodiment of a system 100 for text interpretation and normalization.

Embodiments of the system 100 may be implemented as one or more software programs, e.g., a tokenizer 102 and an interpreter 104, that may stored on a computer-readable medium, loaded into memory and executed by one or more processors. In embodiments the tokenizer 102 and interpreter 104 may be separate computer software programs, separate software modules of one software program or any other variety of software program implementation known to those of ordinary skill in the art. The tokenizer 102 may perform the tokenizing actions described above. For example, in a first phase, the tokenizer 102 may determine the best unique values to use for each reference data entry that will be used for comparison with inbound non-reference data. For example, the tokenizer may decide that the letters "Af" will always be unique enough as the first two letters of a word to uniquely identify the country in question as Afghanistan in addition to also deciding that any combination of "fgh" must be associated with Afghanistan by comparing all of the letters of the other reference strings to this letter combination. The tokenizer 102 may tokenize these unique values to create tokens that are then used in the second phase by the interpreter 104.

The tokenizer 102 may read through all of the distinct standardized strings in the reference data to create a series of machine language operation codes ("opcodes") and "tokens" that may be used as configuration input for the interpreter 104. In the case of the example of normalizing inbound data to a standardized set of country names, the distinct standardized strings will be the approved country names that are to be the basis for normalization of the non-reference inbound data.

The source of standardized strings of the reference data is unimportant. However, it is important to understand that it is a primary purpose of embodiments of the system 100 to try to match inbound, non-reference data to this pre-approved set of standardized strings. A function of the tokenizer 102 is to identify unique string combinations or positions within the reference data that can be used to narrow the possible reference choices. For example: the tokenizer 102 determining that any word beginning with "Afg" associates the word with Afghanistan is useful, but does not completely satisfy the match because the tokenizer 102 has not been determined if there may also be a reference to "Cellular" within the string.

The tokenizer 102 creates individual token/opcodes to be used as a part of a group but is not intended necessary to create the entire configuration. Opcodes are machine language instructions that specify an operation to be performed. The specification and format of the opcodes are laid out in the instruction set architecture of the processor in question (which may be a general CPU or a more specialized processing unit). Apart from the opcode itself, an instruction normally also has one or more specifiers for operands (i.e., data) on which the operation should act, although some operations may have implicit operands, or none at all. The opcodes produced by the tokenizer 102 are instructions that instruct the interpreter 104 on what tests to make against the non-reference data in the normalization process. In certain embodiments, the tokenizer 102 is not responsible for creating all of the possible tests. However, in these embodiments the tokenizer 102 is designed to quickly find unique patterns within the reference data to assist (in conjunction with manually applied tokens/opcodes) in the normalization of the non-reference data. The tokenizer 102 will identify any new tokens (character combinations of any length that can be used to uniquely and accurately "fingerprint" a standardized string) that may be required to be added (based on observations of matches being made incorrectly or with less specificity that needed or anticipated) to the interpreter 104 configuration to improve accuracy of the interpreter 104 while decreasing the amount of human intervention involved in maintaining the standardized set of strings and associated opcodes. In embodiments, human intervention may be required to make modifications to the list of tokens/opcodes generated by the tokenizer 102 to adjust for lack of specificity or trends in the non-reference data that may be identified by a human analyst. For example, if mobile destinations begin to be referred to in some instances as "Afghanistan PCS" instead of the expected possibilities of wireless, mobile or cellular, the token/opcode list will need to be adjusted to allow for that new variant to be associated with Afghanistan-Mobile. The new tokens and opcodes are paired together. Embodiments of the tokenizer 102 perform the following specific functions:

1. Load the list of current tokens and opcodes being used by the interpreter 104, if any. If the interpreter 104 has not been initialized and no reference data analyzed and tokenized, there will be no tokens or opcodes.

2. Read through all of the standardized strings that are present in the reference data to determine if the current tokens and opcodes are sufficient based on any conflicts that may be found between the tokens/opcodes and reference data (for example, finding token/opcode combinations that match to multiple reference strings unexpectedly) to accurately assign all known standardized strings to their identifying code.

3. If any new strings are found in the reference data that are not accurately identified using existing tokens or opcodes (i.e., unique tokens are created from these strings in the reference data) or if there are additional levels of accuracy (for example if there are matches failing on the word "celular" vs "cellular" because of regional spelling then this needs to be dealt with by making the token/opcode set for that destination more inclusive) that can be identified, produce a log output for operations review and potential implementation in a configuration table of the interpreter 104.

4. Receive the following inputs: Current configuration data of the interpreter 104 (tokens and opcodes), list of standardized strings and any associated data (each reference string may have an associated piece of data such as a normalizing numeric code that is assigned to the non-reference data—see example below). Note: the configuration data of the interpreter 104 may be specific for a particular set of data or environment (e.g., telecommunications in China).

5. Produce the following outputs: a log, e.g., /var/log/Tokens.log, identifying any new token/opcode combinations that should be added to the list of tokens/opcodes. Format (text, comma delimited):

Date/Time—Date and time of the tokenizer run. This should be common to all lines output for a single run for information and grouping purposes.

Directive—"Add" or "Del"

Standardized String Code (if used)—the unique code associated with each standardized string (See example below for use of standardized string code)

Standardized String—This is the pre-approved string used as reference data.

Tokens/Opcode combinations (1–n)—The new instructions to be considered for addition to the current configuration for the interpreter 104.

6. In an embodiment, the following are available opcodes that may be produced by the tokenizer 102.

| | |
|---|---|
| <token> | exactly matches token in content and size |
| <token>+ | begins with <token> |
| +<token> | ends with <token> |
| +<token>+ | contains <token> anywhere in the string |
| <token>− | does not begin with <token> |

-continued

| | |
|---|---|
| <token> | does not end with <token> |
| –<token>– | does not contain <token> anywhere in the string |
| maxdigits<##> | maximum length of string |
| mindigits<##> | minimum length of string |

With continuing reference to FIG. 1, an embodiment of the interpreter 104 may be a software program or module that performs two primary functions: load, get. The load and get functions produce a normalized string output that is the output of embodiments of the system 100 for text interpretation and normalization. The interpreter 104 receives a text string, loads configuration data from the tokenizer 102, gets the text string that is to be interpreted and normalized and applies the configuration data to find the most accurate match and produce this match as the normalized text string output:

7. load—reads all of the configuration data for the interpreter 104 into an efficient data structure for use by the "get" function.

8. get—takes the passed in value (the text string to be normalized) and applies all relevant interpreter 104 configuration data in order to find the most accurate match for the text string. The get function returns the standardized, normalized string and associated code, if used, for the line with the most matching criteria and, therefore, the best match. In the case that no match is found, false is returned. Depending on the implementation, the results may be written into a database or a log file.

EXAMPLE

The following table is configuration data of an embodiment of the interpreter 104:

| | | |
|---|---|---|
| 509 | Haiti | maxdigits:14\|mindigits:9\|Haiti+\|–mob–\|–cel–\|+ROC+ |
| 509 | Haiti | maxdigits:14\|mindigits:11\|Haiti+\|–mob–\|–cel–\|+proper+ |
| 509 | Haiti | maxdigits:5\|mindigits:5\|Haiti |
| 509 | Haiti | maxdigits:24\|mindigits:11\|Haiti+\|–mob–\|–cel–\|+other+ |
| 509 | Haiti | maxdigits:30\|mindigits:11\|Haiti+\|–mob–\|–cel–\|+All+\|+Country+ |
| 509OFFM | Haiti Off Net-Mobile | maxdigits:20\|Haiti Off Net-Mobile |
| 5093 | Haiti Port au Prince | Haiti+\|+port+\|+princ+ |
| 509M | Haiti-Mobile | maxdigits:22\|Haiti+\|+Special+\|+Services+ |
| 509M | Haiti-Mobile | maxdigits:14\|Haiti+\|+Mobile+ |
| 509MC | Haiti-Mobile Comcel | Haiti+\|+comc+ |
| 509MD | Haiti-Mobile Digicel | Haiti+\|+mob+\|+Digic+ |
| 509MH | Haiti-Mobile Haitel | Haiti+\|+haitel+ |
| 509MR | Haiti-Mobile Rectel | Haiti+\|+rect+ |

The configuration data here is for normalizing strings that reference a telecommunications description of geographies/services in Haiti. The first column is the code given to each of the standardized strings in the second column. The third column contains the "|" (pipe) delimited token/opcode combinations that will be used to do interpretation by the interpreter 104. As one can see, there may be several token/opcode combinations attempted for each of the standardized strings. If more than one of the combinations matches, the system 100 can be configured to either go with the entry with the longest code (column one) or the entry with the highest number of tokens (most specific).

The following is a narrative interpretation of interpreter 104 configuration data entries shown in the table above:

Apply code 509 ("Haiti") if entry (i.e., text string being interpreted and normalized):
is at least 9 (minidigits:9) but not more than 14 (maxdigits: 14) characters, and
begins with "Haiti" (this is shown by the "Haiti+" which corresponds to the opcode <token>+shown above), and
does not contain "mob" ("-mob-") or "cel" ("-cel-") anywhere in the string, and
does contain "ROC" ("+ROC+") somewhere in the string
OR
is at least 11 but not more than 14 characters, and
begins with "Haiti", and
does not contain "mob" or "cel" anywhere in the string, and
does contain "proper" somewhere in the string
OR
is exactly 5 characters, and
is exactly "Haiti"
OR
is at least 11 but not more than 24 characters, and
begins with "Haiti", and
does not contain "mob" or "cel" anywhere in the string, and
does contain "other" somewhere in the string
OR
is at least 11 but not more than 30 characters, and
begins with "Haiti", and
does not contain "mob" or "cel" anywhere in the string, and
does contain "All" somewhere in the string, and
does contain "Country" somewhere in the string Apply code 509OFFM ("Haiti Off Net-Mobile") if entry i.e., text string being interpreted and normalized):
is no more than 20 characters, and
is exactly "Haiti Off Net-Mobile"

Apply code 5093 ("Haiti Port au Prince") if entry (i.e., text string being interpreted and normalized):
begins with "Haiti", and
contains "port" anywhere in the string, and
contains "princ" anywhere in the string Apply code 509M ("Haiti-Mobile") if entry (i.e., text string being interpreted and normalized):
is no more than 22 characters, and
begins with "Haiti", and
contains "Special" anywhere in the string, and
contains "Services" anywhere in the string
OR
is no more than 14 characters, and
begins with "Haiti", and
contains "Mobile" anywhere in the string Apply code 509MC ("Haiti-Mobile Comcel") if entry text string being interpreted and normalized):
begins with "Haiti", and
contains "come" anywhere in the string Apply code 509MD ("Haiti-Mobile Digicel") if entry text string being interpreted and normalized):
begins with "Haiti", and
contains "Digic" anywhere in the string Apply code 509 MH ("Haiti-Mobile Haitel") if entry (i.e., text string being interpreted and normalized):
begins with "Haiti", and contains "haitel" anywhere in the string, and Apply code 509MR ("Haiti-Mobile Rectel") if entry (i.e., text string being interpreted and normalized):

begins with "Haiti", and contains "rect" anywhere in the string, and

A string being normalized that reads "Haiti Mobile" will match something like this:

Not 509 because: Does not contain "ROC" or "proper" or "other" or "country" and is more than 5 characters Not 509OFFM because: Does not equal exactly "Haiti Off Net-Mobile"

Not 5093 because: Does not contain "port" or "princ"

Not 509MC because: Does not contain "come"

Not 509MD because: Does not contain "Digic"

Not 509MH because: Does not contain "haitel"

Not 509MR because: Does not contain "rect"

Therefore, even though "Haiti Mobile" does not exactly match "Haiti-Mobile," code 509M is selected because it does start with "Haiti," does contain "Mobile" and is not more than 14 characters. By using these three (3) criteria to match it would not matter what separator was used; i.e., the same matching would have worked for "Haiti,Mobile" or "Haiti; Mobile" or "Haiti-Mobile."By speechifying where exact matches are required and where they are not, the technique of embodiments of the system and method for text interpretation and normalization described herein allow for targeted flexibility within a framework of precision.

Looking at this same example, if a string was submitted for normalization that read "Haiti Cellular" there would be no match. Although the above configuration data specifically excludes "cellular" entries from matching the 509 code (Haiti) using the "-cel-" token, there has been no inclusion of cellular for any of the other codes. There is a simple fix: by adding "509M Haiti-Mobile Maxdigits:19|Haiti+|+cellular+" to the configuration data, the configuration data would cause the interpreter 104 to apply the 509M code to "Haiti Cellular" match attempts specifically. In other words, code 509M would apply text strings with less than 20 characters (maxdigits:19) that began with "Haiti" and contained "cellular" anywhere in the string (see opcodes above). Another approach would be to add "509M Haiti-Mobile Maxdigits:19 |Haiti+|+cel+" to the configuration data, allowing for the misspelling of the word cellular.

It is noted that in the configuration data record for 509MC, the tokens do not include a match attempt on "+mob+." This is because the existence of "+recte+" within the string qualifies it enough within the match on "Haiti+" to render a "+mob+" match redundant.

The above example also provides an interesting illustration about reference data used by embodiments described herein. Looking at the above example, there are five different token sets the resolve back to the reference data standardized string "Haiti." Moreover, the standardized string "Haiti" has an associated code of 509. The ultimate goal of a given interpreting task may be to tie the non-reference data to a code of 509, with the string Haiti being the vehicle to do so. Likewise, in this example, there are two "Haiti-Mobile" reference strings that tie back to a code of 509M. When the tokens resolving back to Haiti-Mobile best match the non-reference data entry, the non-reference data entry will be tied back to code 509M.

Figure 2:
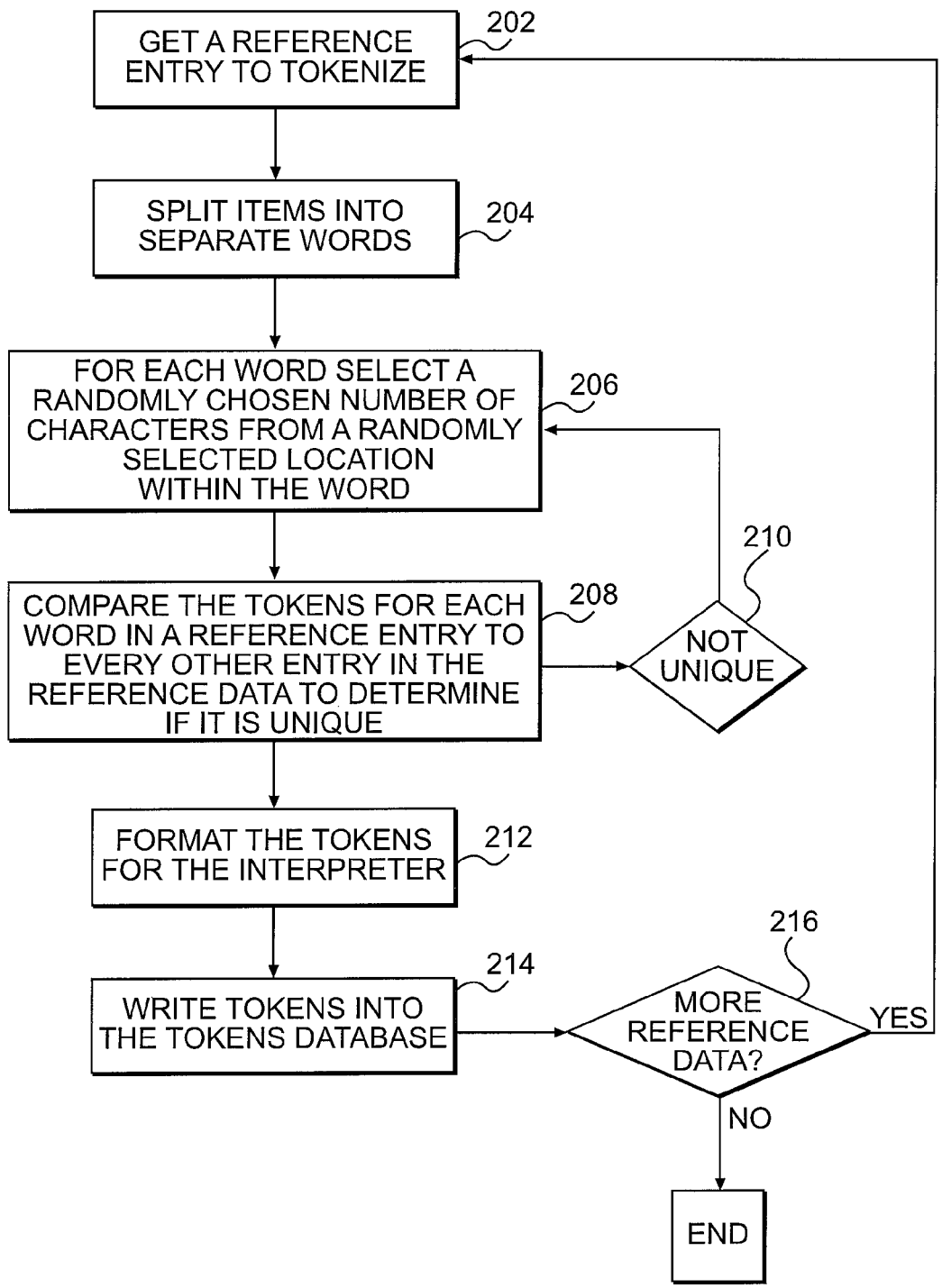
FIG. 2 is a flowchart illustrating a portion of an embodiment of a method for text interpretation and normalization.
Figure 3:
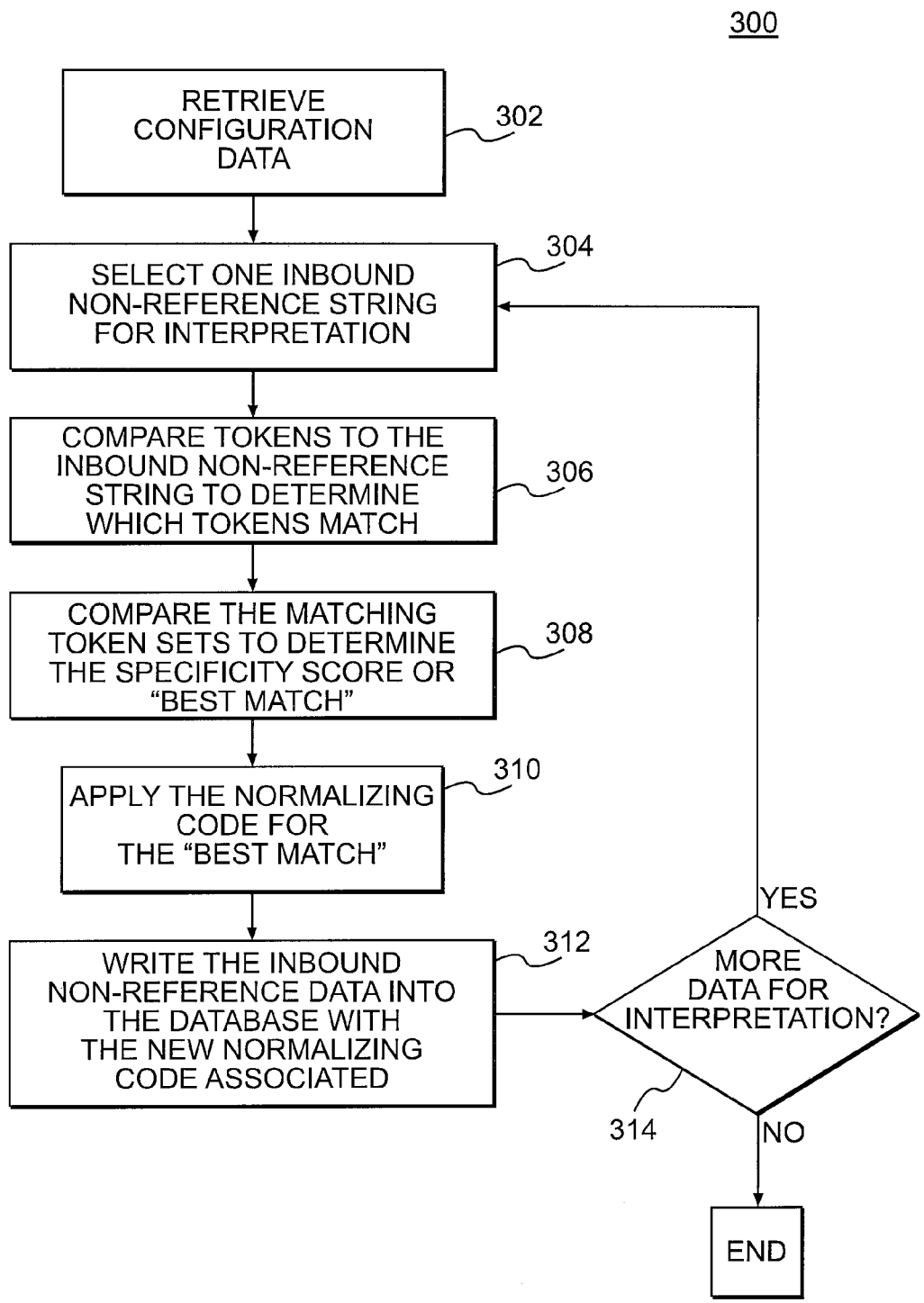
FIG. 3 is a flowchart illustrating a portion of an embodiment of a method for text interpretation and normalization.

With reference now to FIGS. 2-3, shown is a flowchart illustrating an embodiment of a method 200 for text interpretation and normalization. In FIG. 2, the method 200 illustrates steps and process that may be performed by embodiments of the tokenizer 102. Method 200 receives or gets a reference entry as an input to tokenize, block 202. The reference entry is split into separate words, block 204. The tokenizer 102 may split the reference entry into separate words by searching for delimiting characters such as spaces or non-alphabetic characters. For each word that the reference entry has been split into, method 200 randomly selects a random number of characters from a randomly selected location with the word, block 206.

The randomly selected characters may become new tokens added to the configuration data of the interpreter 104. However, the new tokens will not be added if they are not unique. Accordingly, the potential new tokens from each word in the reference entry may be compared to each reference string and every other existing token in the configuration data, if any, and each other, to determine if each potential new token from that word is unique, block 208. In embodiments, each potential new token is compared individually to determine if it is unique before moving to the next potentially unique token. There may be more than one token per word but embodiments tend not to do that due to the tendency on the part of non-reference data to include misspellings. The trick with the token/opcode data is to make the token unique with the fewest number of letters because that gives the greatest flexibility in spelling the rest of the word that is not involved in the token, so misspellings are less of a problem. If a potential new token is determined to be not unique, block 210, the method 200 repeats the random selection of characters from the word from which the non-unique token was generated, block 206, and repeats the comparison to determine if the new randomly selection characters (new potential token) is unique, block 208. The method 200 may continue this process until it has finished processing the standardized strings in the reference data, or until it can generate no more unique tokens.

With continuing reference to FIG. 2, after method 200 has determined that the new tokens are unique, the tokens are formatted for the interpreter 104, block 212. The tokens are formatted for the interpreter 104 by stringing together the appropriate opcode with the token. For example, if the "Afg" token is found to be unique and is the first few letters of the reference string, the token will be combined with an opcode to result in "Afg++". If the same "Afg" token is found to be unique but was not at the beginning or end of the reference string then the token will be combined with an opcode to result in "++Afg++". See above list of potential opcodes of an embodiment for other examples. After formatting for the interpreter 104, the formatted tokens may be written into a token database or otherwise stored in the configuration data for the interpreter 104, block 214. Method 200 determines if there is any more reference data available, block 216. If there is more reference data available, method 200 repeats blocks 202-216.

With reference now to FIG. 3, shown is the continuation of the method 200 for text interpretation and normalization. Method 300 shown in FIG. 3 illustrates steps and process that may be performed by embodiments of the interpreter 104 using output generated by tokenizer 102, e.g., as illustrated in FIG. 2. At start-up, interpreter 104 retrieves or loads configuration data described above, block 302. Interpreter 104 may be used when there are strings that need to be interpreted and normalized. These strings may be referred to as inbound, non-reference strings. Accordingly, method 300 receives and selects one inbound, non-reference string for interpretation, block 304. Typically, embodiments will apply a first in-first out (FIFO) process to select the inbound, non-reference string. Using the tokens retrieved as part of the configuration data, method 200 compares the tokens to the selected non-reference string to determine which tokens, if any, match, block 306. The match determination may be performed as described above, using the tokens and their corresponding opcodes to determine if there is a match.

The matching token sets are compared to determine the specificity score or "best match," based on the token set with the greatest specificity within the digit parameters (if they exist. For example, if a reference string is longer than the "MaxDigits" or shorter than the "MinDigits" it is excluded regardless of the other matching criteria. If the reference string finds token sets that with satisfactory digit parameters (or no digit parameters at all) then the token matching is applied. A token set that includes an exact match is the highest score (most specific). If there is not an exact match then the token set with the highest number of matches wins. For example: a token set matching on "Aft++" only would lose to a token set including "Afg++|++mobile" for the reference string "Afghanistan-Mobile" because of the higher number of matches (greater specificity) block 308. After the best match is determined 308, the normalizing code associated with the best matching token is applied, block 310. The normalizing code is the associated numeric code associated with the standardized string from which the token is derived, described above. For example, in the example provided above, Haiti Mobile was best-matched with Haiti-Mobile; accordingly, code 509M would be applied, producing the "Haiti-Mobile" output. The selected non-reference data string is written to output, e.g., into an output database, with the new normalizing code (e.g., 509M) associated with it, block 312. Method 200 determines if there are more inbound, non-reference strings for interpretation, block 314. If there are more inbound, non-reference strings for interpretation, method 200 repeats blocks 304-314.

With reference now to FIG. 4, shown is a block diagram illustrating exemplary hardware components for implementing an embodiment of system 400 for text interpretation and normalization. Server 410, or other computer similarly configured, may include and run tokenizer 102 and/or interpreter 104 to perform functions described herein, including steps of method 200 described above. Server 410 may connect with Internet, or other network, to receive reference data and non-reference data for interpretation and normalization.

Server 410 typically includes a memory 412, a secondary storage device 414, and a processor 416. Server 410 may also include a plurality of processors 416 and be configured as a plurality of, e.g., bladed servers, or other known server configurations. Server 410 may also include an input device 418, a display device 420, and an output device 422. Memory 412 may include RAM or similar types of memory, and it may store one or more applications for execution by processor 416. Secondary storage device 414 may include a hard disk drive, floppy disk drive, CD-ROM drive, or other types of non-volatile data storage. Processor 416 executes the application(s), such as tokenizer 102 and interpreter 104, which are stored in memory 412 or secondary storage 414, or received from the Internet or other network 426. The processing by processor 416 may be implemented in software, such as software modules, for execution by computers or other machines. These applications preferably include instructions executable to perform the methods described above and illustrated in the FIGS. herein. The applications preferably provide graphical user interfaces (GUIs) through which participants may view and interact with tokenizer 102 and interpreter 104.

Server 410 may store a database structure in secondary storage 414, for example, for storing and maintaining information regarding the configuration data and output normalized data and the methods described herein. For example, it may maintain a relational or object-oriented database for storing tokens and opcodes, and other information necessary to perform the above-described methods.

Also, as noted, processor 416 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system 400.

Input device 418 may include any device for entering information into server 410, such as a keyboard, mouse, cursor-control device, touch-screen, microphone, digital camera, video recorder or camcorder. The input device 418 may be used to enter information into GUIs during performance of the methods described above. Display device 420 may include any type of device for presenting visual information such as, for example, a computer monitor or flat-screen display. The display device 420 may display the GUIs and/or output from interpreter 104. Output device 422 may include any type of device for presenting a hard copy of information, such as a printer, and other types of output devices include speakers or any device for providing information in audio form.

Examples of server 410 include dedicated server computers, such as bladed servers, personal computers, laptop computers, notebook computers, palm top computers, network computers, or any processor-controlled device capable of executing a web browser or other type of application for interacting with the system.

Although only one server 410 is shown in detail, system 400 may use multiple servers as necessary or desired to support the users and may also use back-up or redundant servers to prevent network downtime in the event of a failure of a particular server. In addition, although server 410 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling a computer system, server 410, to perform a particular method, such as methods described above.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A method for text interpretation and normalization, comprising:
   receiving, using a processor and a memory, a reference data entry that includes a plurality of pre-approved, standardized string, reference strings, and one or more associated codes, wherein each associated code is associated with plurality of pre-approved, standardized string, reference strings;

creating, using the processor, one or more tokens for the received reference data entry, wherein each token is tied to an associated code;

splitting the reference data entry into separate words by searching for delimiting characters;

for each word that the reference entry has been split into, randomly selecting a random number of characters from a randomly selected location in one of the separate words;

creating new tokens from the randomly selected characters;

adding new tokens created from the randomly selected characters to the configuration data if the new tokens are unique;

comparing the new tokens from each word in the reference entry to each reference string and every other existing token in the configuration data, if any, to determine if the one or more tokens are unique wherein if one token of the one or more tokens is determined to not be unique, discarding the non-unique token and creating a new, different token if possible;

continue repeating the random selecting characters and comparing until finished processing the standardized string in the reference data;

formatting, using the processor, the one or more tokens with an operations code (opcode) that provides additional information about the token, wherein the one or more tokens is used to interpret non-reference data and associate the non-reference data to one of the one or more associated numeric codes; and writing the formatted token into the token database.

2. The method of claim 1 wherein the creating includes splitting the reference data entry into separate words.

3. The method of claim 1 further comprising repeating the receiving, creating and formatting for additional reference data entries.

4. The method of claim 1 further comprising storing the tokens, opcodes and associated codes as configuration data in a configuration database, wherein the configuration data is used to interpret non-reference data.

5. The method of claim 1, wherein the associated codes contain numerals.

6. A non-transitory computer readable medium comprising instructions that are executed by a processor to perform a method for text interpretation and normalization by:

receiving, using a processor and a memory, a reference data entry that includes a plurality of pre-approved, standardized string, reference strings, and one or more associated codes, wherein each associated code is associated with plurality of pre-approved, standardized string, reference strings;

creating for the received reference data entry, using the processor, one or more tokens, wherein each token is tied to an associated code;

splitting the reference data entry into separate words by searching for delimiting characters;

for each word that the reference entry has been split into randomly selecting a random number of characters from a randomly selected location in one of the separate words;

creating new tokens from the randomly selected characters;

adding new tokens created from the randomly selected characters to the configuration data if the new tokens are unique;

comparing the new tokens from each word in the reference entry to each reference string and every other existing token in the configuration data, if any, to determine if the one or more tokens are unique wherein if one token of the one or more tokens is determined to not be unique, discarding the non-unique token and creating a new, different token if possible;

continue repeating the random selecting characters and comparing until finished processing the standardized string in the reference data;

formatting, using the processor, the one or more tokens with an operations code (opcode) that provides additional information about the token, wherein the one or more tokens is used to interpret non-reference data and associate the non-reference data to one of the one or more associated numeric codes; and writing the formatted token into the token database.

7. The non-transitory computer readable medium of claim 6, wherein the associated codes contain numerals.

8. A system for text interpretation and normalization, comprising:

a computer including a processor and memory, wherein the memory includes a computer program stored therein that includes instructions that are executed by the processor for creating tokens by:

receiving a reference data entry that includes a plurality of pre-approved, standardized string, reference strings, and one or more associated codes, wherein each associated code is associated with plurality of pre-approved, standardized string, reference strings;

creating a plurality of tokens for the received reference data entry, wherein each token is tied to an associated code;

splitting the reference data entry into separate words by searching for delimiting characters;

for each word that the reference entry has been split into, randomly selecting a random number of characters from a randomly selected location in one of the separate words;

creating new tokens from the randomly selected characters;

adding new tokens created from the randomly selected characters to the configuration data if the new tokens are unique;

comparing the new tokens from each word in the reference entry to each reference string and every other existing token in the configuration data, if any, to determine if the one or more tokens are unique wherein if one token of the one or more tokens is determined to not be unique, discarding the non-unique token and creating a new, different token if possible;

continue repeating the random selecting characters and comparing until finished processing the standardized string in the reference data;

formatting the plurality of tokens with operations codes (opcodes) that provides additional information about the tokens, wherein the plurality of tokens is used to interpret non-reference data and associate the non-reference data to one of the one or more associated codes; and writing the formatted token into the token database.

9. The system of claim 8 wherein the instructions further include instructions for comparing the one or more tokens to each other and other existing tokens, if any, to determine if the one or more tokens are unique.

10. The system of claim 8 further comprising a database, wherein the instructions further include instructions for storing the tokens, opcodes and associated codes as configuration data in the database, wherein the configuration data is used to interpret non-reference data.

11. The system of claim 8 wherein the memory further includes a computer program stored therein that includes instructions that are executed by the processor for interpreting non-reference strings by:

retrieving configuration data including the plurality of tokens, the opcodes, and codes associated with the tokens;

selecting one inbound, non-reference string for interpretation;

comparing tokens from the configuration data to the non-reference string to determine the best matching token; and applying the code associated with the best matching token to the non-reference string in order to normalize the non-reference string.

12. The method of claim 11 further comprising comparing tokens from the configuration data to the non-reference string to determine matching tokens, wherein the comparing to determine the best matching token compares the matching tokens to determine the best match.

13. The system of claim 8, wherein the associated codes contain numerals.

\* \* \* \* \*